US007847018B2

(12) United States Patent
Barfurth et al.

(10) Patent No.: US 7,847,018 B2
(45) Date of Patent: Dec. 7, 2010

(54) POLYMER DISPERSION COMPRISING SILICON COMPOUNDS

(75) Inventors: Dieter Barfurth, Rheinfelden (DE); Helmut Mack, Traunstein (DE)

(73) Assignee: Evonik Degussa GmbH, Essen (DE)

( * ) Notice: Subject to any disclaimer, the term of this patent is extended or adjusted under 35 U.S.C. 154(b) by 950 days.

(21) Appl. No.: 10/566,371

(22) PCT Filed: Jun. 2, 2004

(86) PCT No.: PCT/EP2004/050992

§ 371 (c)(1),
(2), (4) Date: Jan. 30, 2006

(87) PCT Pub. No.: WO2005/014676

PCT Pub. Date: Feb. 17, 2005

(65) Prior Publication Data

US 2008/0146730 A1 Jun. 19, 2008

(30) Foreign Application Priority Data

Jul. 28, 2003 (DE) ................. 103 34 574

(51) Int. Cl.
*C08L 83/06* (2006.01)
(52) U.S. Cl. .............. 524/837; 524/588; 524/556
(58) Field of Classification Search ............ 524/837, 524/588, 556
See application file for complete search history.

(56) References Cited

U.S. PATENT DOCUMENTS

| | | | |
|---|---|---|---|
| 4,172,189 A | 10/1979 | Muller et al. | |
| 5,753,733 A * | 5/1998 | Eck et al. ............. | 524/265 |
| 6,133,466 A | 10/2000 | Edelmann et al. | |
| 6,239,194 B1 | 5/2001 | Standke et al. | |
| 6,251,989 B1 | 6/2001 | Edelmann et al. | |
| 6,395,858 B1 | 5/2002 | Mack et al. | |
| 6,403,228 B1 | 6/2002 | Mack et al. | |
| 6,444,315 B1 | 9/2002 | Barfurth et al. | |
| 6,500,883 B1 | 12/2002 | Mack et al. | |
| 6,528,585 B1 | 3/2003 | Standke et al. | |
| 6,770,327 B2 | 8/2004 | Edelmann et al. | |
| 6,780,955 B2 | 8/2004 | Barfurth et al. | |
| 6,784,272 B2 | 8/2004 | Mack et al. | |
| 6,841,197 B2 | 1/2005 | Standke et al. | |
| 2002/0127415 A1 | 9/2002 | Standke et al. | |
| 2003/0134969 A1 | 7/2003 | Schlosser et al. | |
| 2004/0054048 A1 | 3/2004 | Barfurth et al. | |

FOREIGN PATENT DOCUMENTS

| | | | |
|---|---|---|---|
| EP | 1 045 009 | | 10/2000 |
| EP | 1045009 A1 * | | 10/2000 |
| EP | 1 172 412 | | 1/2002 |
| EP | 1172412 A1 * | | 1/2002 |

OTHER PUBLICATIONS

U.S. Appl. No. 10/524,689, filed Feb. 15, 2005, Barfurth, et al.
U.S. Appl. No. 10/555,984, filed Nov. 8, 2005, Barfurth, et al.

* cited by examiner

*Primary Examiner*—Satya B Sastri
(74) *Attorney, Agent, or Firm*—Oblon, Spivak, McClelland, Maier & Neustadt, L.L.P.

(57) ABSTRACT

The present invention relates to a polymer dispersion wherein the components of a physical mixture comprising (i) at least one unsaturated silane of the general formula (I): $[H_2C=CX(Y)_n]Si(CH_3)_p(R)_{3-p}$ in which X is a hydrogen atom or a methyl group, Y is a divalent group selected from $—CH_2—$ and $—C(O)O—(CH_2)_3—$, n is 0 or 1, R is an alkoxy group selected from methoxy, ethoxy, n-propoxy, isopropoxy, n-butoxy, isobutoxy, and 2-methoxyethoxy, and p is 0 or 1, and (ii) at least one organosilane of the general formula (II): $R^1Si(CH_3)_q(R^2)_{3-q}$ in which $R^1$ is a linear, branched or cyclic alkyl group having 1 to 18 carbon atoms or is an aryl group or is a polyether group, $R^2$ is an alkoxy group selected from methoxy, ethoxy, n-propoxy, isopropoxy, n-butoxy, isobutoxy and 2-methoxyethoxy, and q is 0 or 1, and/or at least one silicic ester of the general formula (III): $Si(R^3)_4$, in which groups $R^3$ are identical or different and $R^3$ is an alkoxy group selected from methoxy, ethoxy, n-propoxy, isopropoxy, n-butoxy and isobutoxy, are incorporated into the framework of the polymer, a process for preparing such a polymer dispersion, and its use.

21 Claims, No Drawings

POLYMER DISPERSION COMPRISING SILICON COMPOUNDS

The present invention relates to polymer dispersions, to a process for preparing them, and to their use.

Unsaturated silanes, such as DYNASYLAN® VTMO (vinyltrimethoxysilane), DYNASYLAN® VTEO (vinyltriethoxysilane), and DYNASYLAN® MEMO (3-methacryloyloxypropyltrimethoxysilane), are industrially important compounds whose uses include the modification of polymer dispersions, in which case, as comonomers, they are copolymerized into the polymer framework.

It is known to modify polyvinyl acetate dispersions in the form of homopolymers or copolymers, to modify poly(meth)acrylate dispersions as homopolymers or copolymers, such as with methyl acrylate, methyl methacrylate, butyl acrylate, butyl methacrylate, acrylic acid and/or methacrylic acid as monomer and comonomer, to modify styrene acrylate dispersions with styrene comonomer, and to modify polyvinyl alcohol dispersions.

Components used to produce said polymers are virtually without exception unsaturated components which can be crosslinked in order to achieve effective incorporation into the system. Thus, for example, vinylsilanes are used for vinyl acetate dispersions and polyvinyl alcohol dispersions, and methacrylic and/or acrylic silanes for acrylate dispersions. The uses of such polymer dispersions include their formulation to adhesives and sealants and also to inks and paints.

Also known are purely physical mixtures of unsaturated silane and alkylsilane and/or organosilane and/or silicic esters (EP 0 202 412).

It is an object of the present invention to provide a further polymer dispersion having improved properties.

This object is achieved in accordance with the invention as specified in the claims.

Surprisingly it has been found that even physical mixtures of (i) unsaturated silane and (ii) organosilane and/or silicic esters can be copolymerized readily and effectively, thereby, with unexpected advantage, allowing the crosslinking density of the polymer dispersion to be increased and at the same time the water resistance of the applied polymer dispersion improved. Moreover, the copolymerization, crosslinking and/or partial condensation—that is, the incorporation of components (i) and (ii) into the framework of the polymer—produce further advantageous improvements in the subsequent film binding properties.

Polymer dispersions of the invention are generally based on high molecular mass resins dispersed in very fine distribution in water or in solvent, examples being (polymer) latexes. These are primary dispersions, for which polymerization takes place directly in the liquid phase. Polymer dispersions of the invention preferably comprise acrylic, aldehyde, epoxy and/or polyester resins, polyurethanes, and/or precursor compounds of the aforementioned components or mixtures thereof. Depending on the particle size of the polymers the systems may be suitably characterized as finely (0.1 to 0.5 μm), intermediately (up to 2 μm) or coarsely (up to 5 μm) disperse systems. In comparison to colloidal solutions, polymer dispersions of the invention generally exhibit a different rheology. Whereas in the case of solutions the viscosity steadily increases as the concentration goes up, in the case of present dispersions it remains generally substantially the same up to a solids content of approximately 50%, after which it rises. Moreover, microdispersions of the invention with particle sizes <0.1 μm can be prepared by the method of microemulsion polymerization using special low or high molecular mass surfactants known per se. Such dispersions can be used with advantage, for example, in aqueous coating materials in order to set special rheological properties, to increase the solids content, and to enhance the gloss.

Incorporated into the polymer framework of subsequent products as well, such as dispersion adhesives and dispersion sealants, polymer dispersions of the invention lead to an increase in the crosslinking density and hence to an increase in the cohesive strength of the applied polymer dispersion.

The present invention accordingly provides a polymer dispersion in which the components of a physical mixture comprising (i) at least one unsaturated silane of the general formula (I)

$$[H_2C{=}CX(Y)_n]Si(CH_3)_p(R)_{3-p} \qquad (I),$$

in which X is a hydrogen atom or a methyl group, Y is a divalent group selected from —CH$_2$— and —C(O)O—(CH$_2$)$_3$—, n is 0 or 1, R is an alkoxy group selected from methoxy, ethoxy, n-propoxy, isopropoxy, n-butoxy, isobutoxy, and 2-methoxyethoxy, and p is 0 or 1, and (ii) at least one organic silane of the general formula (II)

$$R^1Si(CH_3)_q(R^2)_{3-q} \qquad (II),$$

in which R$^1$ is a linear, branched or cyclic alkyl group having 1 to 18 carbon atoms or is an aryl group or is a polyether group, R$^2$ is an alkoxy group selected from methoxy, ethoxy, n-propoxy, isopropoxy, n-butoxy, isobutoxy and 2-methoxyethoxy, and q is 0 or 1, and/or at least one silicic ester of the general formula (III)

$$Si(R^3)_4 \qquad (III),$$

in which groups R$^3$ are identical or different and R$^3$ is an alkoxy group selected from methoxy, ethoxy, n-propoxy, isopropoxy, n-butoxy and isobutoxy, are incorporated into the framework of the polymer.

The present invention further provides a process for preparing polymer dispersions which involves
mixing at least one monomer and components (I) and (ii), dispersing the resulting mixture in surfactant-containing water, and
then carrying out the polymerization.

The monomer, i.e. the precursor compound of the polymer framework, used in the process of the invention is preferably methyl methacrylate, butyl acrylate, butyl methacrylate, acrylic acid, vinyl alcohol, vinyl acetate or a mixture of at least two or more of the aforementioned monomers.

Furthermore, as component (i) it is preferred to employ vinyltrimethoxysilane, vinyltriethoxysilane, vinyltri(2-methoxyethoxy)silane, vinylmethyldimethoxysilane, vinylmethyldiethoxysilane, 3-acryloyloxypropyltrimethoxysilane, 3-acryloyloxypropyl-triethoxysilane, 3-acryloyloxypropylmethyldimethoxysilane, 3-acryloyloxypropyl-methyldiethoxysilane, 3-methacryloyloxypropyltrimethoxysilane, 3-methacryloyloxy-propyltriethoxysilane, 3-methacryloyloxypropylmethyl-dimethoxysilane, 3-methacryl-oyloxypropylmethyldiethoxysilane or a mixture of two or more of the aforementioned silanes.

In addition it is preferred as component (ii) to employ methyltrimethoxysilane, n-propyltrimethoxysilane, n-propyltriethoxysilane, n-propyltri(2-methoxyethoxy)silane, isobutyltrimethoxysilane, isobutyltriethoxysilane, n-hexyltrimethoxysilane, n-octyltrimethoxysilane, n-octyltriethoxysilane, n-octyltri(2-methoxyethoxy)silane, isooctyltrimethoxysilane, isooctyltriethoxysilane, n-hexadecytrimethoxysilane, phenyltrimethoxysilane, phenyltriethoxysilane, tetraethoxysilane, alkyl polyglycol propyltrimethoxysilane or a mixture of two or more of the aforementioned silanes.

Used additionally in the process of the invention is preferably from 0.1 to 10% by weight, in particular from 1 to 2% by weight, of unsaturated silane, based on the total amount of the monomers.

The weight ratio of components (i) and (ii) used in the process of the invention is preferably from 99.9:0.1 to 0.1:99.9, more preferably from 80:20 to 20:80, and in particular 50:50.

In the process of the invention a mixture of components (i) and (ii) is appropriately used in an amount of from 0.05 to 20% by weight, preferably from 0.2 to 1.5% by weight, more preferably from 0.5 to 1.2% by weight, and in particular 1% by weight, based on the amount of the monomers used.

The present invention accordingly likewise provides for the use of a physical mixture of components (i) and (ii) for preparing polymer dispersions.

As surfactant in the process of the invention it is possible to use conventional emulsifiers, i.e., surface-active compounds, such as octylphenol ethoxylate, nonylphenol ethoxylate or dodecylphenol ethoxylate, to name but a few examples.

In the process of the invention it is preferred to employ an aqueous surfactant solution having a surfactant content of from 5 to 15% by weight.

The weight ratio of monomer used to water in the process of the invention is preferably from 40:60 to 60:40, more preferably from 45:55 to 55:45.

The bringing together and dispersing of the respective ingredients takes place in the case of the present process in general at a temperature in the range from 0 to 45° C. The polymerization reaction is preferably operated at from 60 to 65° C.

The polymerization is appropriately initiated free-radically, by adding a free-radical initiator, preferably in the form of an aqueous solution, to the dispersed mixture of monomer, components (i) and (ii), water, and surfactant in the process of the invention, and allowing the reaction mixture to react with thorough mixing and under temperature control. Thus, in the process of the invention it is possible for example—but not exclusively—to use sodium formaldehyde-sulfoxylate, potassium peroxodisulfate, cumene hydroperoxide, azoisobutyronitrile, and other free-radical initiators. The free-radical initiator can also be used in combination with other additions, examples being iron(II) sulfate, potassium metabisulfate, sodium metabisulfate, and sodium thiosulfate.

In addition it is possible for polymer dispersions of the invention to include solvent, such as an alcohol, particularly ethanol, the amount of solvent in the dispersion of the invention being less than 10% by weight, preferably from 0.01 to 5% by weight.

Polymer dispersions of the invention are generally prepared as follows:

In a reaction vessel, which is suitably equipped with a high-speed stirrer mechanism, of the Ultra-Turrax type, for example, a reflux condenser, a thermometer, and a generally double reactant supply system, first of all, in general, a surfactant is dissolved in water and then the monomer component and also components (i) and (ii), individually or as a mixture, are metered in and dispersed. The polymerization can then be free-radically initiated. The ingredients are appropriately combined with intensive commixing and under temperature control. Mixing and subsequent polymerization take place in general in a temperature range between 0 and 70° C. The polymer dispersion formed can be filtered if necessary after the end of the polymerization reaction, and subsequently dispensed into containers. It is also possible to add ammonia or an organic amine to a polymer dispersion obtained in this way, in order to adjust its pH to a value from 6 to 9.

The present invention accordingly also provides the polymer dispersions obtainable by the process of the invention.

Polymer dispersions of the invention can be formulated with advantage for example—but not exclusively—into concrete primers, adhesives and sealants, such as flooring adhesives, binders for flooring backings, textile coatings, and tile adhesives, to name but a few examples, and can also be formulated in inks and paints, such as in the form of a blend, for example, with silicone resins or polyurethane dispersions, including blending with other binders.

Likewise provided by the present invention, therefore, is an article produced using a polymer dispersion of the invention.

The provision of polymer dispersions of the invention makes it possible again to achieve an increase in the crosslinking density in polymer dispersions in conjunction with an improvement in the water resistance of the applied polymer dispersions.

The present invention is illustrated, without its subject-matter being restricted, by the examples which follow.

EXAMPLES

1. Description of Polymerization Apparatus and Experimental Procedure a. Apparatus:

A 1 l four-necked flask was equipped with an IKA Ultra-Turrax T 25 stirrer mechanism, a water-operated reflux condenser, a thermometer, and a double reactant supply system. The reactants (initiator solution and monomer mixture) were metered into the four-necked flask from 2 reservoir flasks (each on a balance) using two Knauer HPLC metering pumps. The reaction flask was heated by way of an oil bath with built-in temperature regulation. A pressure filter with a nylon filter cloth (80 μm, approximately 200 mesh) was used for product filtration.

b. Experimental Procedure:

22.0 g of IGEPAL CA-897 (octylphenol ethoxylate, surface-active agent) were dissolved with stirring in 249.8 g of distilled water. The solution was introduced into the apparatus and heated to about 40° C.

The monomers and the silane components were mixed in the desired proportion, totaling 208.6 g, in one of the reservoir flasks (hereinafter monomer mixture A).

In the second reservoir flask the initiator solution (B) was prepared: 2.0% sodium formaldehyde-sulfoxylate and 0.15% iron(II) sulfate, in solution in distilled water.

At about 40° C. with stirring 2.0 g of a 0.15% strength iron(II) sulfate solution and 1.0 g of potassium peroxodisulfate were added to the IGEPAL solution, and stirring was continued for 5 minutes.

Subsequently 21.0 g of the monomer mixture (A) and 1.5 g of the initiator solution (B) were pumped from the respective reservoir vessels into the reaction flask over the course of 1 minute. A slight temperature increase from 40° C. to 43-44° C. was observed. Stirring was then continued for 15 minutes.

The remainder of the monomer mixture (A) and 10.5 g of the initiator solution (B) were then metered into the reaction flask over the course of 3 hours. When the liquid-phase temperature during this time exceeded 65° C., the system was cooled by removal of the oil bath; if the temperature fell below 60° C., it was heated to 60° C.

using the oil bath. In this way the temperature was held at 60-65° C. and the gently increasing viscosity was kept approximately constant by way of the stirring speed (Ultra-Turrax speed setting: 13 500 revolutions/minute). When the predetermined amounts of monomer mixture (A) and initiator solution (B) had been metered in, stirring was continued at 65° C. for 30 minutes.

Thereafter 3.0 g of 2.0% strength sodium formaldehyde-sulfoxylate solution were metered in over 30 minutes, during which the temperature was held at 65° C. (slightly exothermic reaction).

The resulting polymer dispersion was cooled to room temperature and its pH was adjusted to approximately 7.5 using 10% strength ammonia solution. The product was subsequently filtered in a pressure filter through an 80 µm (200 mesh) nylon filter.

c. Polymerization Batches:

| Examples | Monomer mixture | Silane 1 (Type) | Silane 1 (mol %) | Silane 2 (Type) | Silane 2 (mol %) |
|---|---|---|---|---|---|
| | | Amounts in mol % | | | |
| Comparative Ex. 1 | 46% butyl acrylate 52% methyl methacrylate 2% methacrylic acid | no added silane | | | |
| Comparative Ex. 2 | 46% butyl acrylate 51% methyl methacrylate 2% methacrylic acid | DYNASYLAN ® VTEO | 1 | | |
| Example 1 | 46% butyl acrylate 51% methyl methacrylate 2% methacrylic acid | DYNASYLAN ® VTEO | 0.7 | DYNASYLAN ® PTEO | 0.3 |
| Example 2 | 46% butyl acrylate 51% methyl methacrylate 2% methacrylic acid | DYNASYLAN ® VTEO | 0.5 | DYNASYLAN ® PTEO | 0.5 |
| Example 3 | 46% butyl acrylate 51% methyl methacrylate 2% methacrylic acid | DYNASYLAN ® VTEO | 0.3 | DYNASYLAN ® PTEO | 0.7 |

DYNASYLAN ® VTEO: Vinyltriethoxysilane
DYNASYLAN ® PTEO: Propyltriethoxysilane

2. Testing the Polymer Dispersions as Coating Compositions

The polymer dispersion was applied to four different substrates:
  Glass 8.0 cm×15 cm sheets (thickness: 3 mm)
  Concrete 7.5 cm×15 cm sheets (thickness: 15 mm)
  PVC 8.0 cm×15 cm sheets (thickness: 2 mm)
  Aluminum 8.0 cm×15 cm sheets (thickness: 1 mm)

Test Procedure:

2.1 Cleaning the Test Sheets
  Glass→with acetone and machine-cleaning cloth
  Concrete→with dry machine-cleaning cloth
  PVC→with isopropanol and lint-free cloth (Kimberly-Clark precision cloths)
  Aluminum→with acetone and machine-cleaning cloth 2.2 Coating the Test Sheets The polymer dispersion was applied to the test sheets using a 100 µm doctor blade to form a film (two sheets each per experiment).

The sheets were stored for a week to cure at room temperature (about 20 to 22° C.).

Then one test sheet was stored in a water bath for a week at room temperature (about 20 to 22° C.).

2.3 Testing the Resultant Films by Visual Evaluation:
  Film-formation, adhesion, and elongation prior to water storage
  Adhesion, color, and film after water storage Experimental Results

TABLE 1

Results of adhesion testing

| Substrates coated with polymer dispersion from | Substrate | | | | Test criterion |
|---|---|---|---|---|---|
| | Al | Glass | PVC | Concrete | |
| Comp. Ex. 1 | -- | -- | +- | ++ | Adhesion |
| Comp. Ex. 2 | +- | +- | +- | ++ | Adhesion |

TABLE 1-continued

Results of adhesion testing

| Substrates coated with polymer dispersion from | Substrate | | | | Test criterion |
|---|---|---|---|---|---|
| | Al | Glass | PVC | Concrete | |
| Example 1 | ○○ | ○○ | ++ | ++ | Adhesion |
| Example 2 | +- | +- | ++ | ++ | Adhesion |
| Example 3 | -- | +- | ++ | ++ | Adhesion |

Evaluation scale:
(++ very good)
(+- good)
(-- poor)
(○○ very poor)

The use of polymer dispersions of the invention led to a markedly improved adhesion on PVC and concrete.

TABLE 2

Results of elasticity testing

| Substrates coated with polymer dispersion from | Al | Glass | PVC | Concrete | Test criterion |
|---|---|---|---|---|---|
| Comp. Ex. 1 | ○○ | ○○ | ○○ | ○○ | Elasticity |
| Comp. Ex. 2 | +− | +− | +− | +− | Elasticity |
| Example 1 | ++ | ++ | ++ | ++ | Elasticity |
| Example 2 | +− | +− | +− | ++ | Elasticity |
| Example 3 | +− | +− | +− | ++ | Elasticity |

Evaluation scale:
(++ very good)
(+− good)
(−− poor)
(○○ very poor)

The use of polymer dispersions of the invention led likewise to a markedly improved elasticity of the coatings.

TABLE 3

Results of film formation testing

| Substrates coated with polymer dispersion from | Al | Glass | PVC | Concrete | Test criterion |
|---|---|---|---|---|---|
| Comp. Ex. 1 | −− | −− | −− | −− | Film formation |
| Comp. Ex. 2 | ++ | ++ | ++ | ++ | Film formation |
| Example 1 | ○○ | ○○ | ○○ | +− | Film formation |
| Example 2 | ++ | ++ | ○○ | ++ | Film formation |
| Example 3 | +− | ++ | ○○ | ++ | Film formation |

Evaluation scale:
(++ very good)
(+− good)
(−− poor)
(○○ very poor)

Here again the use of polymer dispersions of the invention led in the case of a number of substrates to improved film formation by the coatings.

TABLE 4

Results of adhesion testing after water storage

| Substrates coated with acrylate dispersion from | Al | Glass | PVC | Concrete | Test criterion |
|---|---|---|---|---|---|
| Comp. Ex. 1 | ○○ | ○○ | +− | +− | Adhesion |
| Comp. Ex. 2 | ○○ | not tested | ++ | not tested | Adhesion |
| Example 1 | ○○ | ○○ | ++ | ++ | Adhesion |
| Example 2 | +− | ○○ | ++ | ++ | Adhesion |
| Example 3 | ○○ | ○○ | +− | ++ | Adhesion |

Evaluation scale:
(++ very good)
(+− good)
(○○ poor)

Additionally, the use of polymer dispersions of the invention led in the case of a number of substrates to improved adhesion of the coatings after water storage.

TABLE 5

Results of chalking testing after water storage

| Substrates coated with acrylate dispersion from | Al | Glass | PVC | Concrete | Test criterion |
|---|---|---|---|---|---|
| Comp. Ex. 1 | X | X | X | X | Chalking |
| Comp. Ex. 2 | X | not tested | — | not tested | Chalking |
| Example 1 | X | X | X | X | Chalking |
| Example 2 | X | X | X | X | Chalking |
| Example 3 | X | X | X | — | Chalking |

Evaluation scale:
(X yes)
(— no)

What is claimed is:

1. A polymer dispersion comprising
   a polymer,
   water, and
   a surfactant;
   wherein said polymer comprises and has incorporated therein in polymerized form:
   an unsaturated silane (i) selected from the group consisting of vinyltrimethoxysilane, vinyltriethoxysilane, vinyltri(2-methoxyethoxy)silane, vinylmethyldimethoxysilane, vinylmethyldiethoxysilane, and combinations thereof,
   an organo silane (ii) selected from the group consisting of methyltrimethoxysilane, n-propyltrimethoxysilane, n-propyltriethoxysilane, n-propyltri(2-methoxyethoxy)silane, isobutyltrimethoxysilane, isobutyltriethoxysilane, n-hexyltrimethoxysilane, n-octyltrimethoxysilane, n-octyltriethoxysilane, isooctyltrimethoxysilane, isooctyltriethoxysilane, n-hexadecyltrimethoxysilane and combinations thereof, and
   a monomer selected from the group consisting of methyl methacrylate, butyl acrylate, butylmethacrylate, acrylic acid and combinations thereof;
   wherein said polymer dispersion is obtained by polymerization of a monomer dispersion comprising:
   said unsaturated silane (i),
   said organo silane (ii),
   said monomer,
   said surfactant, and
   said water;
   wherein in said monomer dispersion:
   a weight ratio of said monomer to said water is from 40:60 to 55:45,
   said water has a surfactant content of from 8.8% to 15% by weight of said water, and
   an amount of said unsaturated silane (i) and said organo silane (ii) ranges from 0.2 to 1.5% by weight, based on the weight of said monomer.

2. A process for preparing said polymer dispersion of claim 1, the process comprising:
   mixing said monomer, said unsaturated silane (i) and said organo silane (ii) to form a mixture,
   dispersing said mixture in surfactant-comprising water to form said monomer dispersion, and
   carrying out a polymerization to form said polymer.

3. The process of claim 2, wherein in said mixture and said monomer dispersion, said unsaturated silane (i) is used in a weight ratio to said organo silane (ii) of from 99.9:0.1 to 0.1:99.9.

4. The process of claim 2, wherein in said mixture and said monomer dispersion, said unsaturated silane (i) is
said vinyltriethoxysilane.

5. The process of claim 4,
wherein in said mixture and said monomer dispersion, said organo silane (ii) is
n-propyltriethoxysilane.

6. A polymer dispersion comprising
a polymer,
water, and
a surfactant;
wherein said polymer comprises and has incorporated therein in polymerized form:
an unsaturated silane (i) selected from the group consisting of vinyltrimethoxysilane, vinyltriethoxysilane, vinyltri (2-methoxyethoxy)silane, vinylmethyldimethoxysilane, vinylmethyldiethoxysilane, and combinations thereof,
an organo silane (ii) selected from the group consisting of methyltrimethoxysilane, n-propyltrimethoxysilane, n-propyltriethoxysilane, n-propyltri(2-methoxyethoxy) silane, isobutyltrimethoxysilane, isobutyltriethoxysilane, n-hexyltrimethoxysilane, n-octyltrimethoxysilane, n-octyltriethoxysilane, isooctyltrimethoxysilane, isooctyltriethoxysilane, n-hexadecyltrimethoxysilane and combinations thereof, and
a polymeric precursor stage selected from the group consisting of a precursor stage of a polyacrylate, a precursor stage of a polymethacrylate, a precursor stage of a polystyrene acrylate, a precursor stage of a polyvinyl alcohol, a precursor stage of a polyvinyl acetate and combinations thereof;
wherein said polymer dispersion is obtained by polymerization of a monomer dispersion comprising:
said unsaturated silane (i),
said organo silane (ii),
said polymeric precursor stage,
said surfactant, and
said water;
wherein in said monomer dispersion:
a weight ratio of said polymeric precursor stage to said water is from 40:60 to 55:45,
said water has a surfactant content of from 8.8% to 15% by weight of said water, and
an amount of said unsaturated silane (i) and said organo silane (ii) ranges from 0.2 to 1.5% by weight, based on the weight of said polymeric precursor stage.

7. A polymer dispersion obtained by the process of claim 2.

8. A method for preparing an adhesive, or a sealant, or an ink or a paint, the method comprising:
adding said polymer dispersion of claim 1 to a concrete primer.

9. An article comprising:
said polymer dispersion of claim 1.

10. The polymer dispersion of claim 1, wherein said monomer is a combination of at least two of methyl methacrylate, butyl acrylate, butyl methacrylate and acrylic acid.

11. The polymer dispersion of claim 1, wherein in said monomer dispersion, said unsaturated silane (i) is vinyltriethoxysilane and said organo silane (ii) is n-propyltriethoxysilane.

12. The polymer dispersion of claim 1, wherein said monomer dispersion further comprises a silicic ester of the general formula (III), $$Si(R^3)_4 \quad (III),$$

wherein groups $R^3$ are identical or different and $R^3$ is an alkoxy group selected from the group consisting of methoxy, ethoxy, n-propoxy, isopropoxy, n-butoxy and isobutoxy; and
wherein the silicic ester of the general formula (III) is incorporated into said polymer during polymerization so that said polymer comprises, in polymerized form, said silicic ester of the general formula (III).

13. The polymer dispersion of claim 6, wherein said polymeric precursor stage is said precursor stage of a polyacrylate.

14. The polymer dispersion of claim 6, wherein said polymeric precursor stage is said precursor stage of a polymethacrylate.

15. The polymer dispersion of claim 6, wherein said polymeric precursor stage is said precursor stage of a polystyrene acrylate.

16. The polymer dispersion of claim 6, wherein said polymeric precursor stage is said precursor stage of a polyvinyl alcohol.

17. The polymer dispersion of claim 6, wherein said polymeric precursor stage is said precursor stage of a polyvinyl acetate.

18. The polymer dispersion of claim 11, wherein in said monomer dispersion, said monomer is selected from the group consisting of butyl acrylate, methyl methacrylate, methacrylic acid, and combinations thereof.

19. The polymer dispersion of claim 18, wherein in said monomer dispersion, said monomer is a combination of butyl acrylate, methyl methacrylate, and methacrylic acid.

20. The polymer dispersion of claim 1, wherein said surfactant is selected from the group consisting of octylphenol ethoxylate, nonylphenol ethoxylate, dodecylphenol ethoxylate, and combinations thereof.

21. The polymer dispersion of claim 6, wherein said surfactant is selected from the group consisting of octylphenol ethoxylate, nonylphenol ethoxylate, dodecylphenol ethoxylate, and combinations thereof.

* * * * *